United States Patent
Carrer et al.

(10) Patent No.: US 9,756,030 B2
(45) Date of Patent: Sep. 5, 2017

(54) SECURE CLOUD BASED MULTI-TIER PROVISIONING

(71) Applicant: EUROTECH S.p.A., Amaro (IT)

(72) Inventors: Marco Carrer, Udine (IT); Cristiano DeAlti, Enemonzo (IT); Alberto Codutti, Ragogna (IT); Stefano Adami, Volano (IT)

(73) Assignee: Eurotech S.P.A., Amaro (UD) (IT)

( * ) Notice: Subject to any disclaimer, the term of this patent is extended or adjusted under 35 U.S.C. 154(b) by 0 days.

(21) Appl. No.: 14/454,801

(22) Filed: Aug. 8, 2014

(65) Prior Publication Data

US 2016/0044012 A1 Feb. 11, 2016

(51) Int. Cl.
*G06F 7/04* (2006.01)
*H04L 29/06* (2006.01)
(Continued)

(52) U.S. Cl.
CPC .......... *H04L 63/08* (2013.01); *H04L 41/0803* (2013.01); *H04L 41/0806* (2013.01);
(Continued)

(58) Field of Classification Search
CPC ...................................................... H04L 63/08
(Continued)

(56) References Cited

U.S. PATENT DOCUMENTS 7,457,853 B1 * 11/2008 Chari .................. G06F 9/44505
709/217

8,752,043 B2 * 6/2014 Hehir ........................ G06F 8/61
717/171
(Continued)

FOREIGN PATENT DOCUMENTS

| EP | 1684169 A1 | 7/2006 |
| EP | 2360871 A1 | 8/2011 |

(Continued)

OTHER PUBLICATIONS

Waheed Iqbal et al., "Adaptive resource providing for read intensive multi-tier applications in the cloud," Future generation system 27, 2011, pp. 871-879.*

(Continued)

*Primary Examiner* — Luu Pham
*Assistant Examiner* — Canh Le
(74) *Attorney, Agent, or Firm* — Eschweiler & Potashnik, LLC

(57) ABSTRACT

Systems, methods, and other embodiments associated with secure cloud based multi-tier provisioning are described. In one embodiment, a method includes storing, in server-side computer storage medium, an activation key for a networked device and a set of configuration parameter values associated with an application to be run by the networked device. The method includes managing access to the computer storage medium such that access to the activation key and the configuration parameter values by unauthorized entities is prevented. Upon receiving the activation key from an authorized installation entity, the method includes identifying a configuration for the networked device comprising the set of configuration parameter values. A network connection is made with the networked device and the configuration is transmitted to the networked device, such that the configuration is not provided to the authorized installation entity.

17 Claims, 10 Drawing Sheets

(51) Int. Cl.
*H04L 12/24* (2006.01)
*H04L 29/08* (2006.01)
*H04W 4/00* (2009.01)
*H04W 12/08* (2009.01)

(52) U.S. Cl.
CPC .............. *H04L 41/28* (2013.01); *H04L 67/10* (2013.01); *H04L 67/12* (2013.01); *H04W 4/001* (2013.01); *H04W 4/003* (2013.01); *H04W 4/005* (2013.01); *H04W 12/08* (2013.01)

(58) Field of Classification Search
USPC ........................................................... 726/6
See application file for complete search history.

(56) References Cited

U.S. PATENT DOCUMENTS

| | | |
|---|---|---|
| 2003/0051029 A1 | 3/2003 | Reedy et al. |
| 2003/0084177 A1 | 5/2003 | Mulligan |
| 2003/0097422 A1 | 5/2003 | Richards et al. |
| 2004/0260774 A1 | 12/2004 | Jensen et al. |
| 2008/0288938 A1 | 11/2008 | DeHaan |
| 2009/0249076 A1* | 10/2009 | Reed ...................... G06Q 30/00 713/181 |
| 2009/0253409 A1 | 10/2009 | Slavov et al. |
| 2010/0058444 A1* | 3/2010 | DeHaan ................ G06F 21/629 726/4 |
| 2010/0100876 A1 | 4/2010 | Glover et al. |
| 2011/0145891 A1* | 6/2011 | Bade ..................... H04L 63/101 726/4 |
| 2011/0200052 A1* | 8/2011 | Mungo ................. H04L 41/028 370/401 |
| 2011/0265158 A1 | 10/2011 | Cha et al. |
| 2012/0083228 A1 | 4/2012 | Baumert et al. |
| 2012/0151574 A1* | 6/2012 | Zhang .................. G06F 21/121 726/19 |
| 2013/0324121 A1 | 12/2013 | Kwon et al. |
| 2014/0020061 A1 | 1/2014 | Popp et al. |
| 2014/0122674 A1* | 5/2014 | Gray ................... H04L 41/0846 709/222 |
| 2015/0257176 A1* | 9/2015 | Vyas ................... H04W 76/002 370/338 |

FOREIGN PATENT DOCUMENTS

| | | |
|---|---|---|
| KR | 20020046668 A | 6/2002 |
| WO | 2004045139 A2 | 5/2004 |
| WO | 2013120225 A1 | 8/2013 |

OTHER PUBLICATIONS

Bhaskar Prasad Rimal et al., "A Taxonomy and Survey of Cloud Computing Systems," IEEE computer society, 2009, pp. 44-51.*
Logmein Xively; "API Docs: Provisioning."; Printed Aug. 19, 2014; pp. 1; https://xively.com/dev/docs/api/product_management/provisioning.
Logmein Xively; "API Docs: Activate a Device."; Printed Aug. 19, 2014; pp. 1-3; https://xively.com/dev/docs/api/product_management/devices/activate_device.
DIGI: iDigi Platform. "Device Cloud Overview."; Printed Aug. 19, 2014; pp. 1-4; redirected to Etherios.com/products/devicecloud/ from: http://www.idigi.com.
ILS: Devicewise. "Platform—Overview."; printed Aug. 19, 2014; pp. 1; http://www.devicewise.com/platform/overview.
Exosite: One Platform. "Provisioning Device Interaction."; printed Aug. 19, 2014; pp. 1-3; https://support.exosite.com/hc/en-us/articles/200293838-Provisioning-Device-Interaction.
Exosite: One Platform. "Provisioning Vendor Device Management."; printed Aug. 19, 2014; pp. 1-3; https://support.exosite.com/hc/en-us/articles/200293848-Provisioning-Vendor-Device-Management.
Exosite: One Platform. "Device Provisioning and Fleet Management."; printed Aug. 19, 2014; pp. 1-2; https://github.com/exosite/docs/tree/master/provision.

* cited by examiner

SECURE CLOUD BASED MULTI-TIER PROVISIONING

BACKGROUND

The provisioning of networked devices in machine-to-machine (M2M) or Internet of Things (IoT) applications is a complex task. Provisioning is the process during which a device, initially configured with a default factory configuration, is deployed in the field and activated. As part of the provisioning process the device receives the application code and configuration parameter values it needs to execute the application. The provisioning process can happen over-the-air as part of a post-production step. In the M2M context, provisioning is often applied to thousands of devices and is generally performed in the field while the device is connected to the Internet over-the-air. Provisioning often involves several entities including the device manufacturer, the application developer, the service provider, the device installer, and the ultimate client. Provisioning that actively involves multiple entities for networked device installation, configuration, and activation is referred to as "multi-tier" provisioning.

SUMMARY

In one embodiment, a computer-implemented method includes, with a server, storing, in server-side computer storage medium, an activation key for a networked device. The method includes storing, in the computer storage medium, a set of configuration parameter values associated with an application to be run by the networked device. Access to the computer storage medium is managed such that access to the activation key and the configuration parameter values by unauthorized entities is prevented. Upon receiving the activation key from an authorized installation entity, a configuration for the networked device is identified that includes the set of configuration parameter values. The method includes making a network connection with the networked device and transmitting the configuration to the networked device, such that the configuration is not provided to the authorized installation entity.

In one embodiment, the method includes receiving dynamic configuration parameter values from the authorized installation entity and adding the dynamic configuration parameter values to the set of configuration parameter values in the configuration.

In one embodiment, the method includes, in response to receiving the activation key from the authorized entity, accessing a binding object that is associated with the networked device, wherein the binding object maps a selected configuration with the networked device and is stored in the computer storage medium. The selected configuration is transmitted to the networked device.

In one embodiment, the method includes receiving, from an entity different from the authorized installation entity, a local network configuration for a local network in which the networked device is being installed and storing the local network configuration in the computer storage medium. Upon receiving a request from the authorized installation entity, the local network configuration is transmitted to an installation device. The installation device is connected to the networked device through a local proximity link that is independent of the local network. The installation device is configured to transmit the local network configuration to the networked device using the local proximity protocol. The method includes receiving connection confirmation from the networked device on the local network indicating that the networked device is connected to the server. The configuration is transmitted to the networked device by way of the local network.

In one embodiment, the method includes receiving, from a first entity that is different from the authorized installation entity, a first configuration parameter value for the networked device and storing the first configuration parameter value in the computer storage medium. The method includes receiving, from a second entity that is different from the authorized installation entity, a second configuration parameter value for the networked device and storing the second configuration parameter value in the computer storage medium. Access to the computer storage medium is managed such that the second entity is prevented from reading the first configuration parameter value.

In one embodiment, the method includes providing a configuration template that defines a set of configuration parameters associated with an application to be run by the networked device. The method includes capturing, from a selected one of the first entity and the second entity, one or more configurations for the networked device. Each configuration includes a unique set of configuration parameter values for at least a subset of the configuration parameters. The first configuration parameter value and the second configuration parameter value are members of at least one of the configurations.

In one embodiment, the method includes receiving, from an entity different from the authorized installation entity, an identifier for the authorized installation entity. The method includes receiving, from an entity, valid credentials for the authorized installation entity, determining that the entity is the authorized installation entity, and providing the activation key to the authorized installation entity.

In one embodiment, a computing system includes a networked device and a provisioning server. The networked device is configured to operate according to a set of configuration parameter values for corresponding configuration parameters. The provisioning server is configured to create a configuration for the networked device comprising the plurality of configuration parameter values. The provisioning server is configured to collect first configuration parameter values for the networked device from a first entity and second configuration parameter values for the networked device from a second entity and store storing the configuration parameter values in server side computer storage medium. The provisioning server is configured to access to the computer storage medium such that the second entity is prevented from reading the first configuration value and verifying credentials received from an authorized installation entity seeking to activate the networked device. When the credentials are verified, the provisioning server is configured to transmit the configuration parameter values to the networked device such that the configuration parameter values are not transmitted to the authorized installation entity.

In one embodiment, the networked device includes device resident computer storage medium storing default configuration parameters, wherein the default configuration parameters include connectivity information that is used by the networked device to connect to the provisioning server.

In one embodiment, the provisioning server includes procurement logic configured to create a procurement object associated with the networked device. The procurement object is stored in server side computer storage medium and includes a networked device identifier for the device, an owner of the device, and an activation key. The provisioning server is configured to prevent access to the procurement object by the authorized installation entity.

In one embodiment, the provisioning server includes configuration logic configured to create i) one or more configuration objects, wherein each configuration object comprises configuration parameter values for a selected subset of the configuration parameters, and ii) a binding object that maps a selected configuration object to the networked device. The one or more configuration objects and binding object are stored in server side computer storage medium. The configuration logic is configured to prevent access to the configuration objects by the authorized installation entity.

In one embodiment, the provisioning server includes device connection logic configured to receive local network configuration related configuration parameter values associated with a local network in which the networked device is being installed. Upon receiving a request from the authorized installation entity, the device connection logic is configured to transmit the local network configuration related configuration parameter values to an installation device connected to the networked device through a local proximity link that is independent of the local network. The installation device is configured to transmit the local network configuration related configuration parameter values to the networked device using the local proximity link. The device connection logic is configured to receive connection confirmation from the networked device on the local network indicating that the networked device is connected to the provisioning server. The provisioning server is configured to transmit the configuration to the networked device by way of the local network. The installation device prevents the authorized installation entity from reading the local network configuration related configuration parameter values.

In one embodiment, the provisioning server includes activation logic configured to, upon receiving a request from the authorized installation entity, receive, from the authorized installation entity, dynamic configuration parameter values from the authorized installation entity. The provisioning server is configured to store the dynamic configuration parameter values in the configuration for the networked device.

In one embodiment, non-transitory computer-readable storage medium storing computer-executable instructions that when executed by a computer cause the computer to perform corresponding functions to perform secure cloud based multi-tier provisioning. The instructions include, with a server, storing, in server-side computer storage medium, an activation key for a networked device. The instructions include storing, in the computer storage medium, a set of configuration parameter values associated with an application to be run by the networked device. Access to the computer storage medium is managed such that access to the activation key and the configuration parameter values by unauthorized entities is prevented. Upon receiving the activation key from an authorized installation entity, a configuration for the networked device is identified that includes the set of configuration parameter values. The instructions include making a network connection with the networked device and transmitting the configuration to the networked device, such that the configuration is not provided to the authorized installation entity.

In one embodiment, the instructions include receiving dynamic configuration parameter values from the authorized installation entity and adding the dynamic configuration parameter values to the set of configuration parameter values in the configuration.

In one embodiment, the instructions include, in response to receiving the activation key from the authorized entity, accessing a binding object that is associated with the networked device, wherein the binding object maps a selected configuration with the networked device and is stored in the computer storage medium. The selected configuration is transmitted to the networked device.

In one embodiment, the instructions include receiving, from an entity different from the authorized installation entity, a local network configuration for a local network in which the networked device is being installed and storing the local network configuration in the computer storage medium. Upon receiving a request from the authorized installation entity, the local network configuration is transmitted to an installation device. The installation device is connected to the networked device through a local proximity link that is independent of the local network. The installation device is configured to transmit the local network configuration to the networked device using the local proximity protocol. The instructions include receiving connection confirmation from the networked device on the local network indicating that the networked device is connected to the server. The configuration is transmitted to the networked device by way of the local network.

In one embodiment, the instructions include receiving, from a first entity that is different from the authorized installation entity, a first configuration parameter value for the networked device and storing the first configuration parameter value in the computer storage medium. The instructions include receiving, from a second entity that is different from the authorized installation entity, a second configuration parameter value for the networked device and storing the second configuration parameter value in the computer storage medium. Access to the computer storage medium is managed such that the second entity is prevented from reading the first configuration parameter value.

In one embodiment, the instructions include providing a configuration template that defines a set of configuration parameters associated with an application to be run by the networked device. The instructions include capturing, from a selected one of the first entity and the second entity, one or more configurations for the networked device. Each configuration includes a unique set of configuration parameter values for at least a subset of the configuration parameters. The first configuration parameter value and the second configuration parameter value are members of at least one of the configurations.

In one embodiment, the instructions include receiving, from an entity different from the authorized installation entity, an identifier for the authorized installation entity. The instructions include receiving, from an entity, valid credentials for the authorized installation entity, determining that the entity is the authorized installation entity, and providing the activation key to the authorized installation entity.

BRIEF DESCRIPTION OF THE DRAWINGS

The accompanying drawings, which are incorporated in and constitute a part of the specification, illustrate various systems, methods, and other embodiments of the disclosure. The illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be

DETAILED DESCRIPTION

Existing provisioning solutions support a third party installation contractor role by providing limited access to the platform content. This requires the definition, management, and maintenance of an installation contractor specific user profile for each installation contractor. Providing even limited access to platform content can compromise platform security.

Other provisioning solutions generate and manage (device ID, activation key) pairs and allow activation of a device using the proper (ID, key) pair. When a third party installs devices in this scenario, the platform content is exposed to security issues caused by lack of monitoring, verification and auditing of the installation process. For example, in these scenarios, an agreement between the customer and the installation contractor is not tracked by the provisioning process, meaning that stolen devices can be activated by anyone with the (ID, key) pair for the device. Further, the customer may need to provide proprietary data such as local network configuration information to unknown installation contractor personnel.

Some provisioning solutions require that, prior to activation, the networked devices have an out-of-the-box preliminary configuration prior to in-field deployment. This out-of-the-box approach requires that the installation contractor know all the initial configuration settings and manually set the configuration directly or through a configurator device. Allowing an installation contractor knowledge of the configuration settings introduces security issues and the manual entry of settings is prone to errors.

Figure 1:
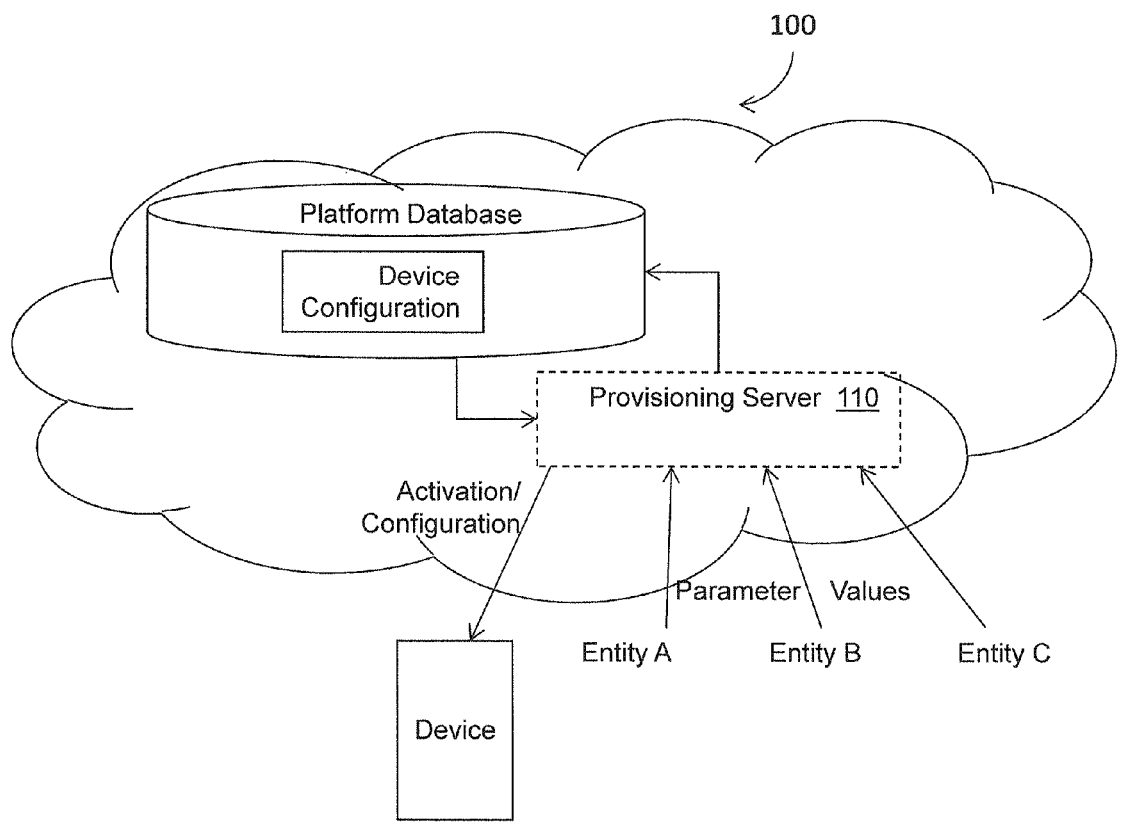
FIG. 1 illustrates one embodiment of a system associated with secure cloud based multi-tier provisioning.

Described herein are example devices, methods, and other embodiments associated with secure cloud based multi-tier provisioning. FIG. 1 illustrates one embodiment of a provisioning system 100 in which a provisioning server 110 is used to securely provision a cloud-enabled networked device. The cloud-enabled networked device can be any device or appliance that collects data and sends the data to a cloud-based platform that archives and analyzes the data. The platform may also remotely control the device. The device may collect data using sensors, cameras, meters, and so on. The device may be a "black box" with multiple input and output interfaces and an internal processor capable of running an installed application that processes data obtained through the input interfaces and outputs data through the output interfaces. Data collected by the device may be transmitted to a cloud platform for long term storage in a database.

The provisioning server 110 provides a process to securely provision the device for multi-tier deployment scenarios in which each entity (e.g., entities A-C) at each tier defines, controls, and manages only his pertinent information while the cloud based provisioning server 110 monitors, verifies, and guides the device activation process. Entities authorized by the provisioning server 110 are allowed to define, manage, and access configuration parameters for which they are responsible, while entities are prevented by the provisioning server 110 from accessing the configuration parameters for which they are not responsible. The configuration parameter values are injected directly into the networked device after pre-activation by an authorized installation contractor. The configuration parameter values can be collected over a period of time by the various entities in the secure manner described below and kept separate from the networked device until the time of activation. The configuration parameter values are stored in the platform database until they are communicated to the device at installation time. This reduces the chance of unauthorized activation of the networked devices for other than their intended purpose.

For the purposes of this description the term "configuration parameter" is used broadly to entail any provisioning information and software that is used by the networked device to provide a designated service. Configuration parameters include application settings, operating system settings, networked device settings, networked device input/output interface settings, and so on. In this description, the term configuration parameter may also include the application binary itself. A "configuration parameter value" refers to a specific instance of a "configuration parameter." For example a configuration parameter "minimum operating voltage" may have a configuration parameter value of "2 V DC" in one instance and a configuration parameter value of "10 V DC" in another instance. Configuration parameters include "static" configuration parameters that are independent of the device's installation site as well as "dynamic" configuration parameters that are not determined until installation. Values for the dynamic configuration parameters will usually be input by the installation contractor. Dynamic configuration parameters may be site or installation dependent (e.g., final location of the device, information about the building where the device is installed, language preference, and so on).

Figure 2:
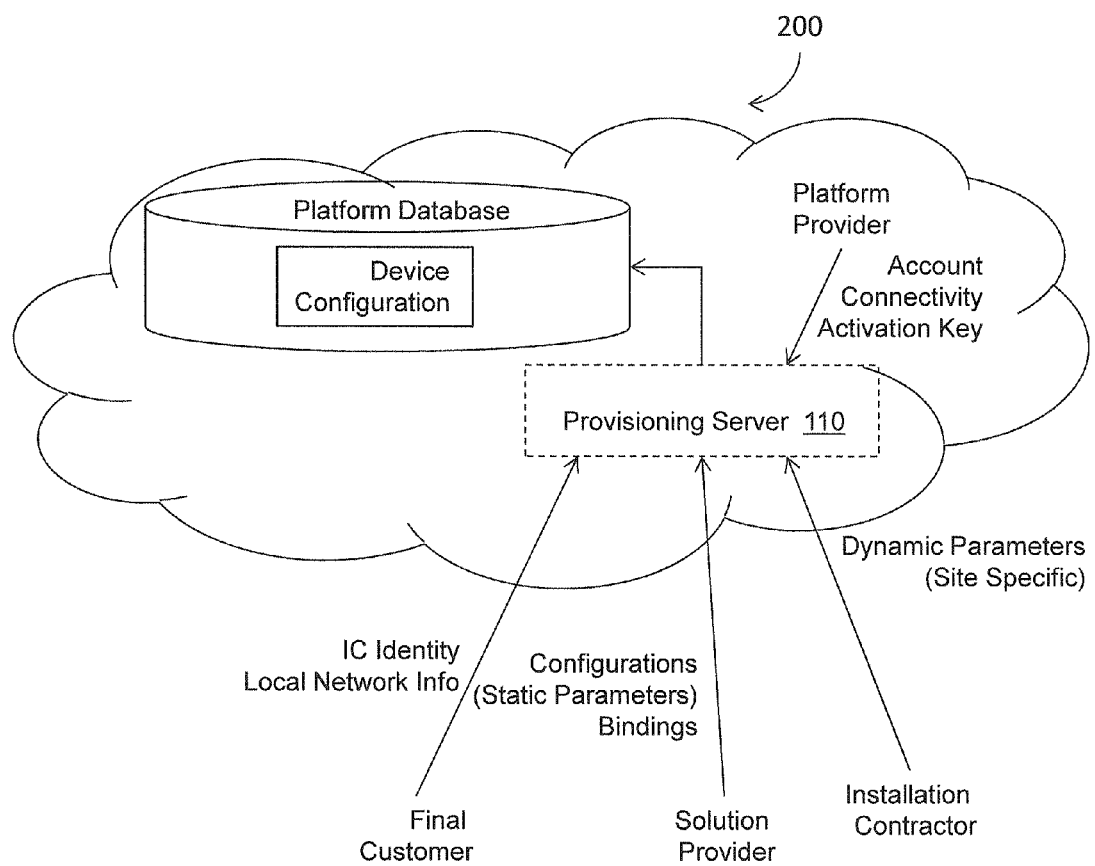
FIG. 2 illustrates the system of FIG. 1 collecting configuration parameters for various entities.

FIG. 2 illustrates one embodiment of a secure cloud based multi-tier provisioning system 200 in which various configuring entities provide various configuration parameter values to the provisioning server 110. In the following document, several entities are referenced that are involved in one example of a typical provisioning process. The entities include a 1) platform provider (DPP) that may also be the manufacturer of the device, 2) a solution provider (SP) who is usually the entity who develops the application and/or the vendor of the service provided by the networked device, 3) an installation contractor (IC) who installs and activates the device in the field, and 4) the final customer (FC) who pays the SP for the service provided by the networked device. While these specific entities will be referenced throughout this document, in some embodiments, a subset of these entities and/or other different entities are involved in the provisioning process.

The DPP is a vendor offering a cloud-based platform to which the networked devices connect to provide remote device management, data collection, and transmission. One of the features offered by the DPP platform is a device configuration container which holds and manages configuration information provided to the networked devices during provisioning. The DPP supplies a provisioning agent application that is installed in the device during initial setup. The provisioning agent runs on the device and allows any type of hardware to be provisioned using the process described herein. Configuration parameters that may be set by the DPP include an account for which the device is registered, connectivity information used by the device to connect to the provisioning server 110, and an activation key that, when received, will trigger activation of the device.

The SP is a solution provider who builds an application for the final customer. The application leverages the device and platform. In a pre-deployment phase, the SP develops the application requested by the FC and sets up the device configuration container according to the application's needs. The SP may develop several configurations that can be used by devices based on their end use. The configurations are stored in the platform database. The SP binds particular devices to particular configurations. A device's specific configuration will be installed in the device configuration container for the device. Sometimes, the SP is the FC. For example, customers with software development skills can build applications over the DPP products. While the model presented herein keeps these two roles separate, the entities taking on these roles can overlap.

The FC or SP delegates to an IC the task of physically deploying and installing his device in the field. To this end, the FC provides the provisioning server 110 with the identity of a designated IC. The FC also provides local network information that will allow the device to join a local network in the location where the device is being installed. As will be described in more detail below, in some embodiments the provisioning server 110 may prevent the IC from reading this local network information.

The IC deploys the devices at an end user site designated by the FC. The IC locally initializes the device with the local network information from the provisioning server. The IC sets dynamic configuration parameter values in the device configuration container and requests activation of the device from the provisioning server.

As shown in FIG. 1, during activation, the provisioning server 110 pushes the configuration parameter values from the device configuration container directly to the networked device (not through the IC). The networked device automatically configures itself based on the configuration parameter values it received and starts execution of the application. The IC verifies that the activation and provisioning was successful. The various embodiments described herein separate the concerns of the roles of the different entities involved in the provisioning process so that a "least privilege" security principle is maintained throughout the provisioning process.

Figure 3:
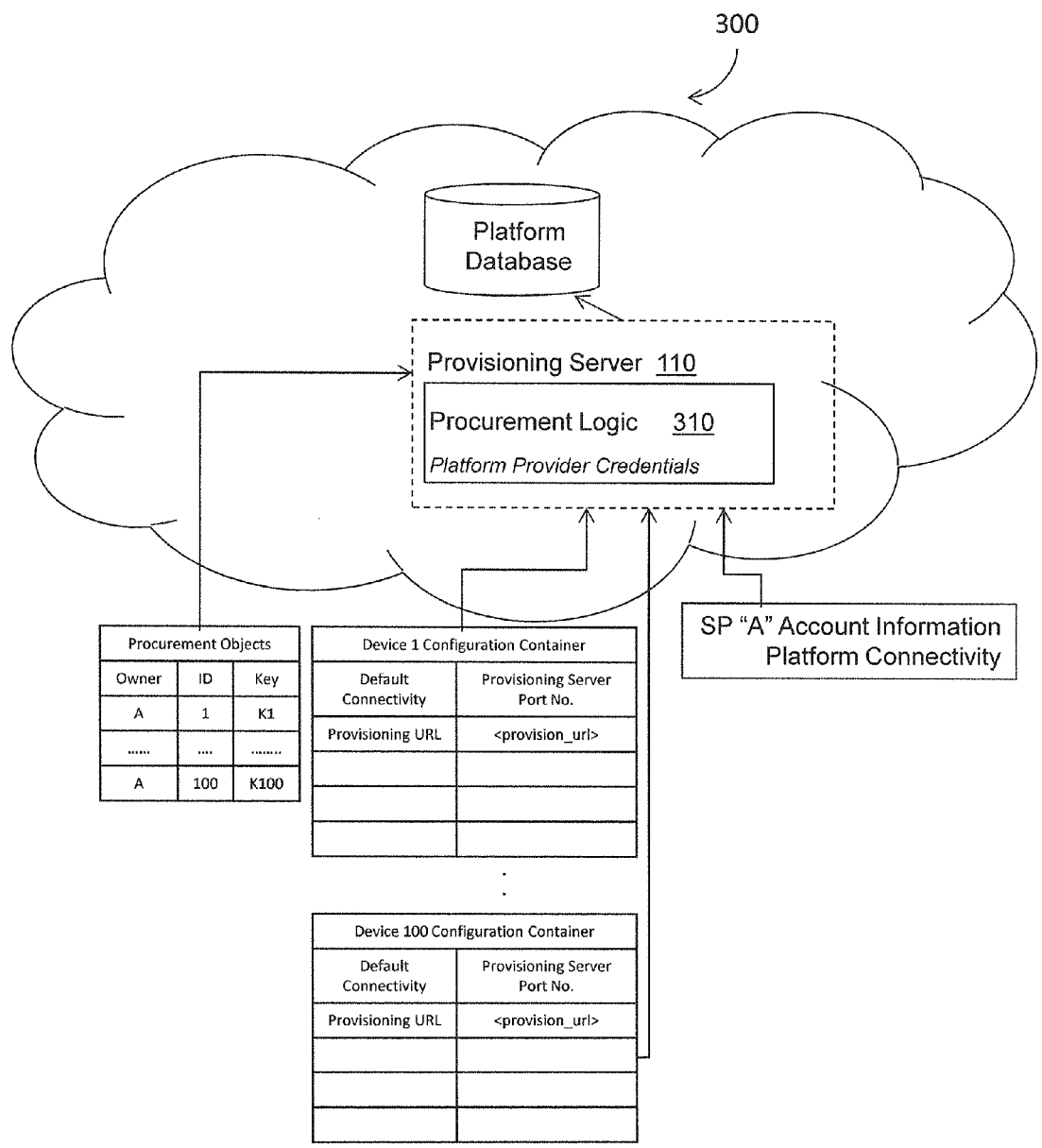
FIG. 3 illustrates one embodiment of a system associated with secure cloud based multi-tier provisioning creating procurement objects and configuration containers.

FIG. 3 illustrates one embodiment of a provisioning system 300 performing initial steps in provisioning a cloud enabled networked device (not shown). The networked device is produced by the DPP and is imaged with default software which contains the URL and credentials necessary to connect to the provisioning server 110. All devices produced by the DPP can have this same initial software and URL, there is no need to customize the default device image based on the final customer or service provider. Each device has a unique identification code (ID). For example, the ID can be derived or computed from device-dependent hardware specific information. The ID is stored in device resident computer storage medium so that it is accessible to software and also labeled on the device's enclosure.

The provisioning server 110 includes procurement logic 310. The procurement logic 310 is configured to create a procurement object for the device. The procurement logic 310 enforces platform provider credentials, meaning that only the DPP can create or access the procurement object. When an SP orders a quantity of devices, the procurement logic 310 creates an account for the SP. The procurement logic 310 registers each device purchased by the SP to the SP account. The procurement logic 310 also generates an activation key for the devices.

In some embodiments, a unique activation key is generated for each device while in other embodiments, the same activation key may be assigned to multiple devices. The activation key may be configured to expire after a certain period of time. The SP may be prevented from reading the activation key. The procurement logic 310 also creates a broker account through which the device will provide collected data to the platform during normal operation and associates configuration parameter values related to platform connectivity for the broker account with the SP's account.

A procurement object for a device includes the device's owner (e.g., SP), the device's ID, and the activation key that has been assigned to the device. FIG. 3 illustrates procurement objects for devices 1-100 which have been registered to SP "A". A device configuration container is created for each device, which at this point in the provisioning process contains default connectivity information as well as the URL that can be used to connect with the provisioning server 110. The procurement objects and device configuration containers are stored in server side computer storage medium (e.g., the platform database). Access to the computer storage medium is controlled at all times by the provisioning server 110.

Figure 4:
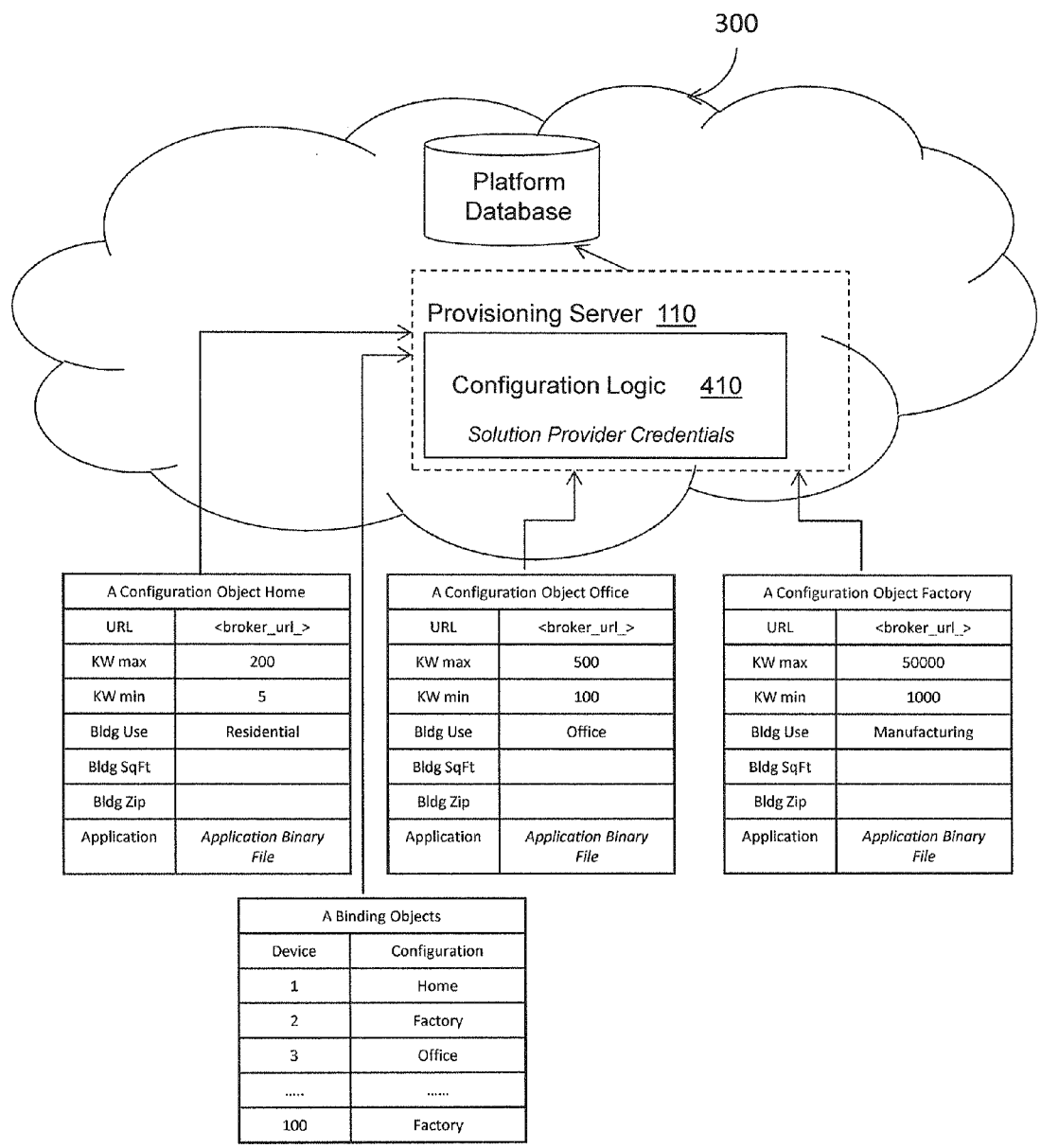
FIG. 4 illustrates the system of FIG. 3 creating configurations and binding objects.

FIG. 4 illustrates the provisioning system 300 in a next stage of the provisioning process. The provisioning server 110 includes a configuration logic 410 that allows the SP to create configuration objects that seed the configuration parameter values that will be provided to the devices during activation and deployment. The configuration logic 410 enforces SP credentials during creation of the configuration objects. The configuration logic 410 provides an extensible configuration template (created by the platform provider) that allows the SP to capture configuration parameters including, for example: connection parameters (URL and credentials for the broker account) that the device needs to connect to the platform during normal operation, static configuration parameters and their default values, dynamic parameters whose values will be provided by the IC during device activation, and one or more application binaries that will be installed on the device. The application binaries rely on the configuration parameter values in the configuration object to adjust the application's run time behavior to the specific characteristics of the environment in which is deployed.

Depending on the heterogeneity of the devices being deployed or the topology of the deployment, any number of configuration objects may be created by the SP and stored in the platform database. For illustrative purposes only, configuration objects are shown that might be used to configure networked devices that will be used as electrical power meters being purchased by metering solution provider (SP) and provided for use by a utility company (FC). Three configuration objects are created by the SP using the configuration template: a home configuration object, an office configuration object, and a factory configuration object. Each configuration object includes four static configuration parameters: URL, a maximum KW, a minimum KW, and a building use. Each configuration includes different values for these static configuration parameters. Two dynamic configuration parameters are included in the configuration objects: building square footage and building zip code. However no values are stored for these parameters because the values will be provided by the IC at device activation.

The configuration logic 410 also creates binding objects that map each registered device to one of the configuration objects. The binding objects allow the SP to identify which configuration is to be applied to each registered device and to easily change a device's configuration by changing a single value in the binding object. The binding objects are stored in the platform database. The provisioning server 110 controls access to the configuration objects and binding objects so that the IC and FC may not read the configuration objects or binding objects. Note that the configuration objects can be created and modified over a period of time, independent of the physical location of the devices themselves, meaning that the devices can be shipped before, during, or after creation of the configuration objects.

Figure 5:
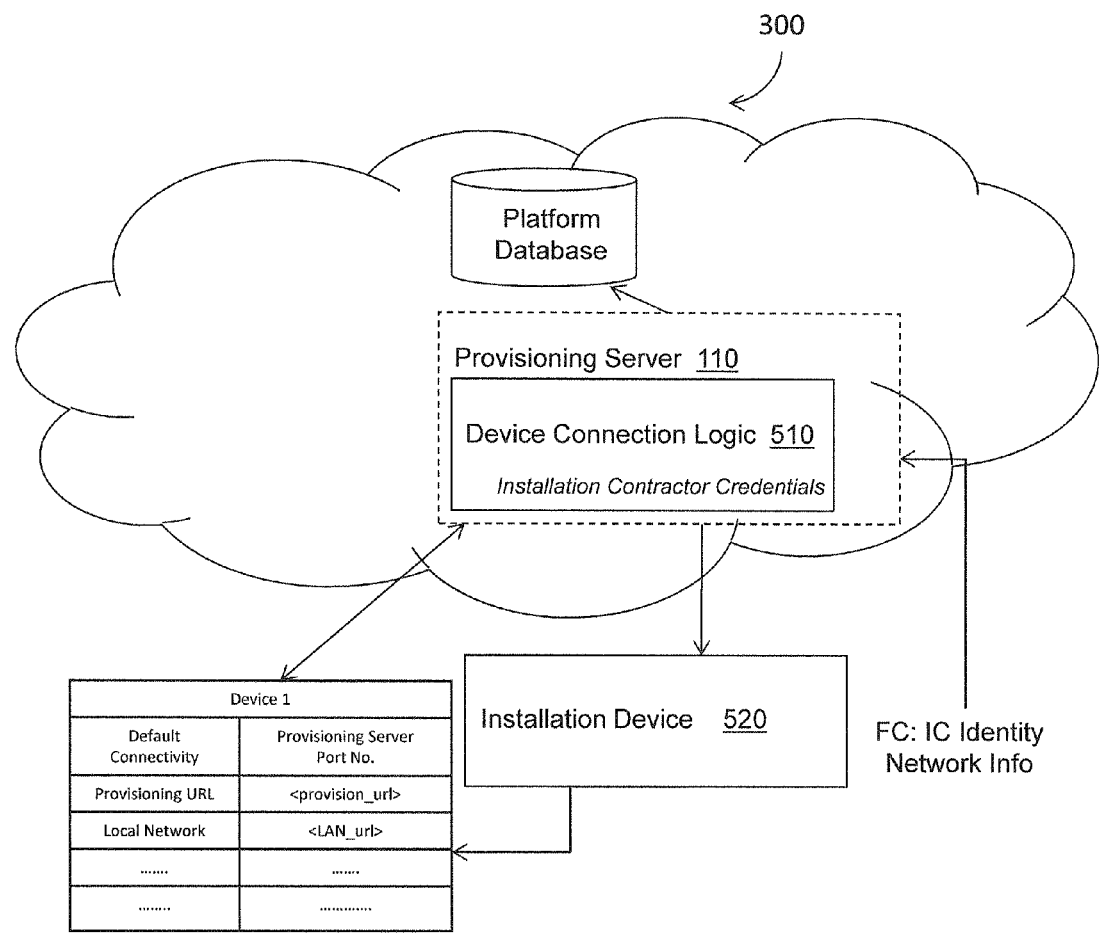
FIG. 5 illustrates the system of FIG. 3 installing local network configuration information on a networked device.

FIG. 5 illustrates the provisioning system 300 in a next stage of device provisioning. The provisioning server 110 includes a device connection logic 510 that is configured to interact with an installation device 520. In one embodiment, the installation device is a smart phone or other portable networked device that is running an installation application and is connected to the provisioning server 110 by way of the Internet and to the networked device through a local proximity link and protocol (typically wireless, e.g., Bluetooth, WiFi, NFC, and so on). The IC is at the installation site and is in possession of the device and the installation device. To activate the device, the only information the IC needs is the ID of the device and the account (SP) to which the device is registered.

The device connection logic 510 is configured to provide the FC with limited access to the provisioning server 110 to identify the IC that will be performing the installation and to record local site configuration parameter values that will be needed during installation. The local site configuration parameters include local network configuration information that the device will need to connect to the local network and thereby access the Internet. The local site configuration parameter values are stored in server side computer storage medium (e.g., platform database) and the provisioning server 110 prevents access to the local site configuration parameter values by the IC (and, optionally, the SP).

To enable the Internet connection in the device, the IC logs in to the provisioning server 100 using credentials that identify the IC as the same IC that was designated by the FC above. The IC provides the ID of the device (which can be found on the device's label) and the name of the account to which the device is registered. If the provided information matches the device's procurement object, the provisioning server 110 transmits the local site configuration parameters to the installation device 520, which applies the local site configuration parameters to the device. The device responds by establishing an Internet connection with the provisioning server 110 by way of the local network. Note that the local site configuration parameters were not exposed to the IC during this step, but rather were transferred to the device through the installation device. The device now enters a "waiting for activation" state.

Figure 6:
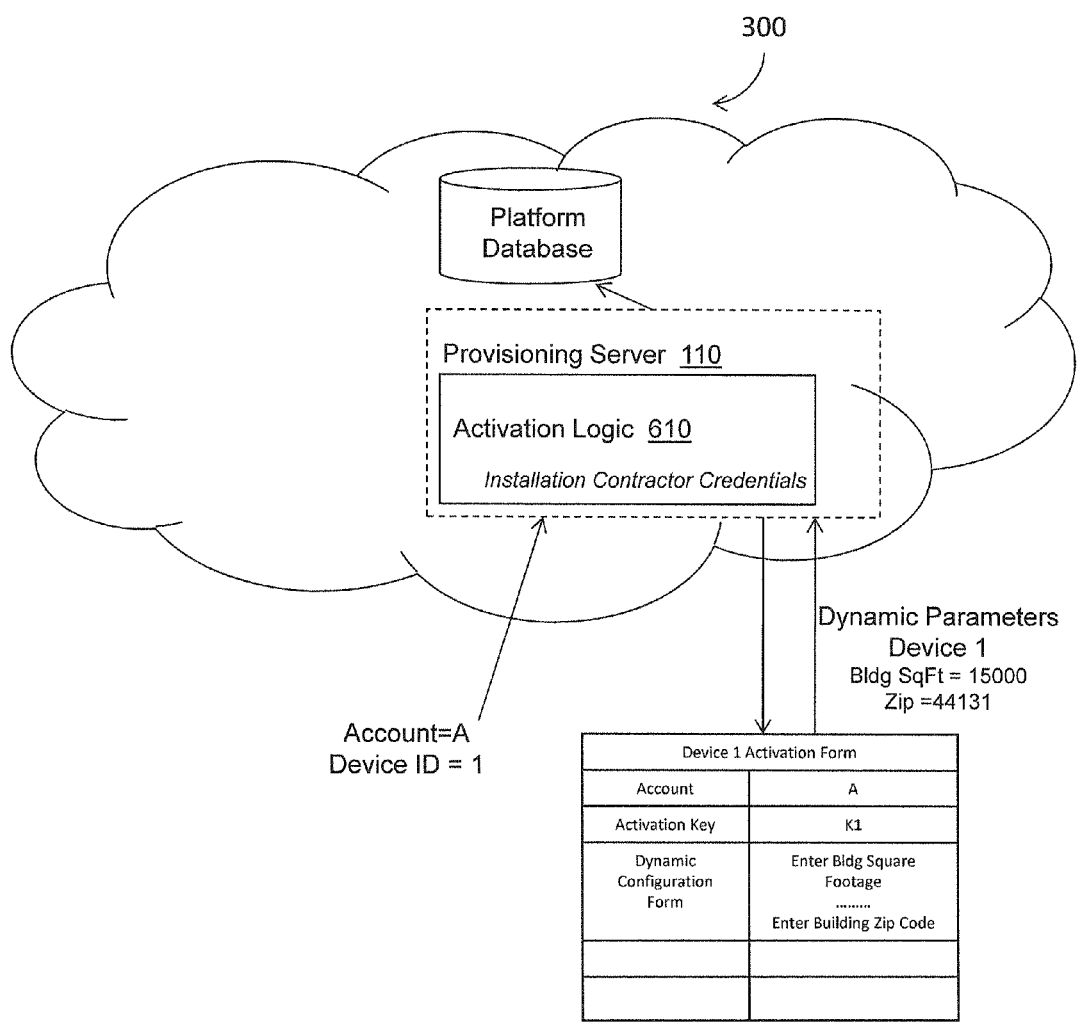
FIG. 6 the system of FIG. 3 creating an activation form for the networked device.

FIG. 6 illustrates the provisioning system 300 in a next stage of device provisioning. The provisioning server 110 includes activation logic 610. During activation, the provisioning server 110 enforces installation contractor credentials such that only the authorized IC can perform activation. Once the device is connected to the Internet, the activation logic 610 provides an activation form for the device to the IC to be filled in to activate the device. The activation form includes the account name, the activation key for the device, and a dynamic configuration form that allows the IC to input the dynamic configuration parameter values for the device. In the example shown in FIG. 6, the dynamic configuration parameters include building square footage and building zip code. The IC uses the form to provide values for the dynamic configuration parameters (e.g., 15,000 square feet and 44131). The activation logic 610 creates an activation object for the device that includes the dynamic configuration parameter values and the device ID. The dynamic configuration parameter values are also stored in the platform database as part of the device's configuration container.

Figure 7:
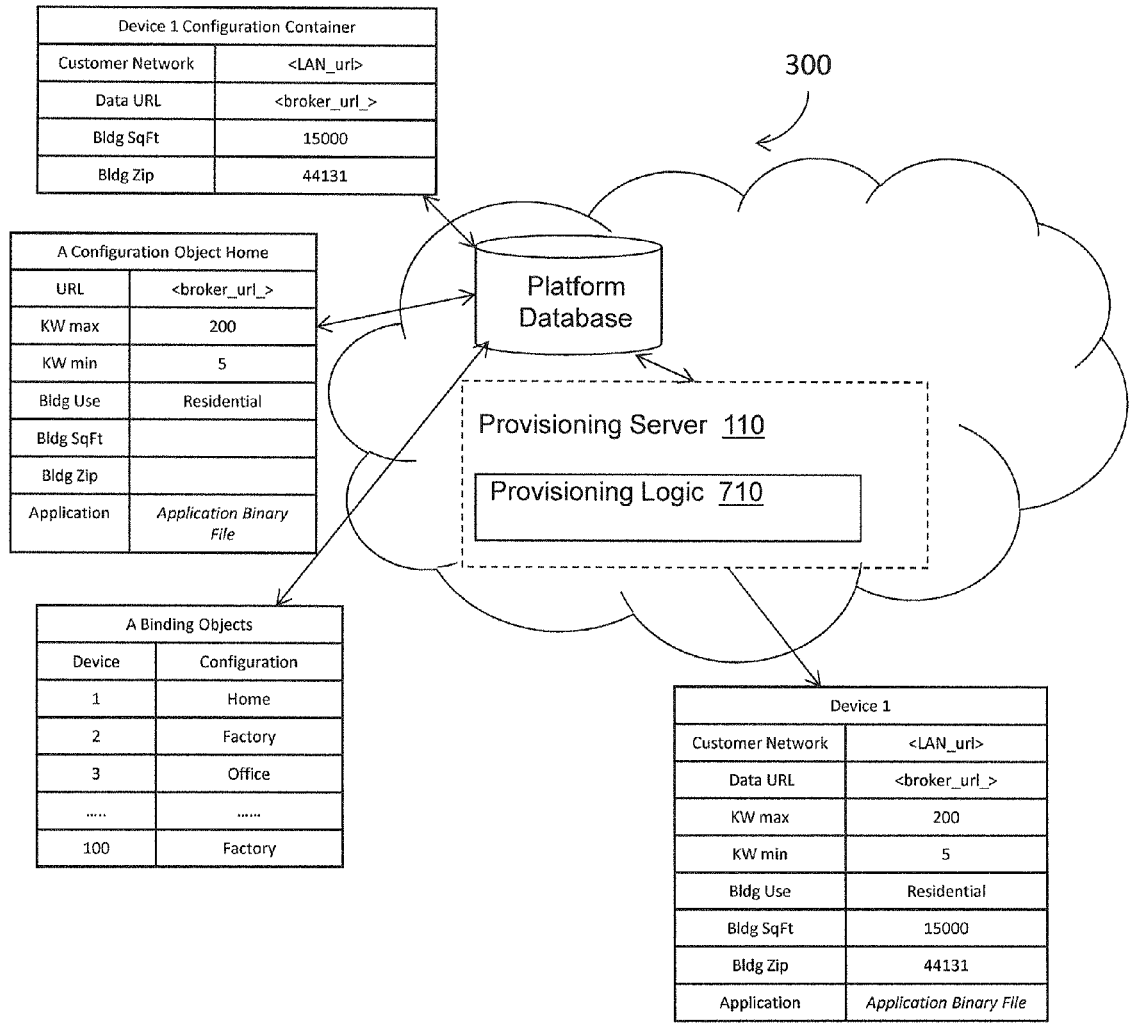
FIG. 7 illustrates the system of FIG. 3 provisioning the networked device.
Figure 8:
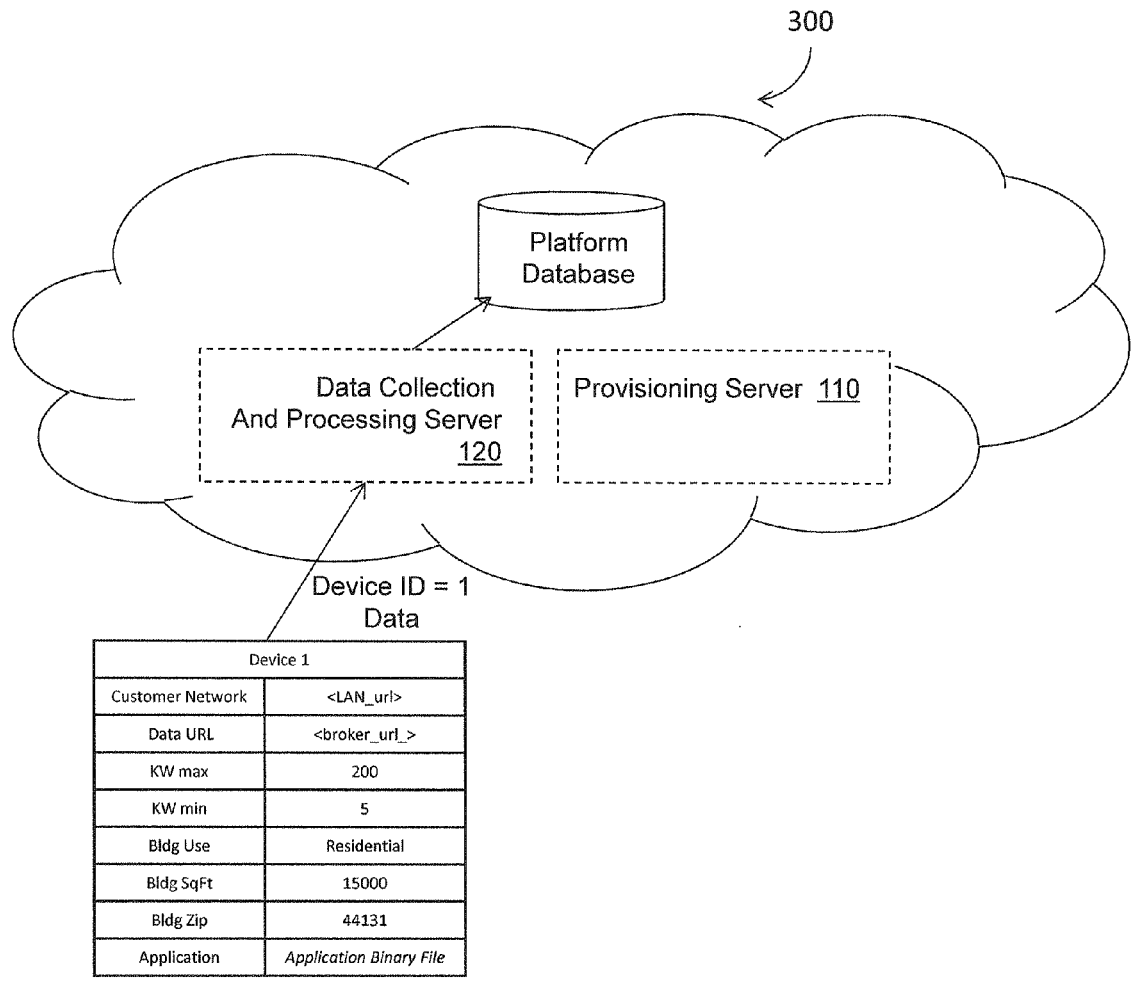
FIG. 8 illustrates the system of FIG. 3 providing data to the cloud based platform.

FIG. 7 illustrates the provisioning system 300 in a next stage of device provisioning. The provisioning server 110 includes provisioning logic 710 that automatically (i.e., without further intervention from the IC) provisions the device. The provisioning logic 710 traverses the binding objects to determine which configuration object is bound to the device ID. The static configuration parameter values and the dynamic configuration parameters are resolved and the final configuration for the device, including the application binary, is packaged by the provisioning logic 710 for transfer to the device. The provisioning server 110 contacts the device with the ID in the activation object and sends the device configuration and application binary from the device's configuration container to the device. The device verifies the provided data and configuration and disconnects from the provisioning server 110. The device applies the configuration and starts the provisioned customer application and configuration as shown in FIG. 8. The device now communicates with a data collection and processing server 120 that is configured to collect, analyze, and store the data collected and transmitted by the networked device during normal operation. For example, when the device is used as an energy meter, the data from the device can now be used to compute the mean kilowatt consumption per hour for a building in which the device is installed.

As can be seen from the above description with reference to FIGS. 3-8, the secure cloud based multi-tier provisioning process provides many benefits. For example, a stolen device cannot be activated for another account without proper IC credentials, an activation key, and a reconfiguration at the DPP level. A stolen activation key cannot be used to activate devices belonging to another account. The IC cannot see or access the FC local network configuration information at any point in the process. The IC cannot see or access the configuration parameter values provided to the device by the provisioning server. The provisioning process described above allows shipment of devices directly to the installation site without first shipping the devices to the SP. The IC is provided with the activation codes once the IC is validated for activating the devices. Thus, the only time the activation code and the device are in the same place is at the installation site during activation, minimizing the possibility of security issues.

In one embodiment, the application binary may be included in the initial software image installed in the device at the factory. In this case, the application binary is not part of the configuration that is transmitted during provisioning.

In another embodiment, the application binary is an installation application. Provisioning configures the device and provides access to the platform. After provisioning the running installer will access the platform to download the final application. This allows development work on the application to continue beyond the provisioning process.

In one embodiment, the SP can enable the FC account as soon as the related device configurations are established. In another embodiment, when the SP provides the IC with devices, this operation is recorded by the platform. The platform will then automatically enable the FC account within a provided deployment time window. The FC deployment requires low access rights to the platform. The FC needs only to provide the IC identity and the local site parameters (e.g., local network configuration). When the IC arrives in the field, the FC records his identity (e.g., personal information or company ID). If the SP has already recorded an IC list, the platform will verify the IC. The FC provides the platform with the local network configuration to enable WAN access to the deployed device. The platform will check this configuration.

By providing the FC with the (ID, Activation key) list, the platform can provide a strong check on each device in the hands of the IC by checking each device ID and emitting the corresponding activation key. On confirmation of the device list, the platform will enable the installation console, which provides anonymous access, for configuration and activation.

In one embodiment, the installation device can be a wireless terminal provide by the FC or C having two independent wireless interfaces. While the first interface will be already configured (by the installation device owner) to enable Internet access, the interface will be compatible with the device wireless interface (e.g., Wi-Fi, Zigbee, and so on). The IC will use the first wireless interface to connect to the installation console This access will run a client application for device pre-activation.

The IC provides the device ID to the console. The platform records the attempted pre-activation for the specific installation device (e.g., by calculating a unique ID form the installation device's hardware information). The client application configures the second wireless interface with a device compatible factory reset configuration to enable wireless communication with a generic device. The client application tests the device's local communication channel. For example the device reset-configuration state for an 802.11 wireless enabled device can use a DHCP mechanism to connect a predefined DHCP server on the installation device. In another embodiment, the device can perform a default out-of-reset sleep state exit in response to a broadcast message from the installation device. The client application configures the device's wireless interface with the device's information to enable WAN access, specifically to the provisioning server (e.g., the address and access credential information already stored in the device during the production). This approach allows an automatic pre-activation process without any IC intervention.

In one embodiment, the provisioning server can verify the successful connection for the device under pre-activation. The pre-activation step should be performed on the installation site to check the real local network connectivity so that problems due to wireless coverage, masking, and so on can be identified and resolved. The installation console informs the IC and records the pre-activation for the device by the identified installation device. The provisioning server then enables the activation console. The device verifies the connection with the provisioning serer and goes to a low power mode "waiting for activation" state. This state may prevents any device activity to preserve battery life or may allow some interaction with the provisioning server. The installation console closes and automatically moves the installation interface to the activation console with the known device ID. The IC can finalize the activation process or postpone it.

The IC finally activates an installed device access the activation console in the platform. He can use the installation device or any other terminal device provided with network access to the platform. The IC enters the device Id to activate the device, using an anonymous access level. The platform verifies any provided dynamic parameters. If the dynamic parameters are acceptable, the platform enables the activation key input. The platform verifies the ID, activation key pair and can optionally enable an "activate now" button.

In one embodiment, the provisioning server contacts an activated device that is waiting for provisioning and they negotiate a secure channel. If the channel is established, the provisioning server sends the configuration parameter values to the device. In the case of an error during the provisioning process the device can provide visual feedback to the IC and notification to the provisioning server when possible. For example an LED may blink and/or the activation application running on the installation device may provide an alarm. If the provisioning operation fails, the device will not apply the new configuration and it will fall back to the waiting for activation mode. The IC can test the device and repeat the activation procedure, eventually in a specific test mode where the activation and provisioning process provides extensive logging and testing. When errors occur while the provisioned configuration is being applied or the application binary is being executed, the device can provide visual feedback to the user about the error. If the device can automatically reload to factory reset configuration plus the last local network configuration, it can re-connect to the provisioning server and interact with the IC through the IC client terminal. Otherwise the IC may manually command a factory reset to the device and restart the full deployment process. When the provisioning operation succeeds the device will be recorded as activated on the platform and the device will start executing the application code.

Figure 9:
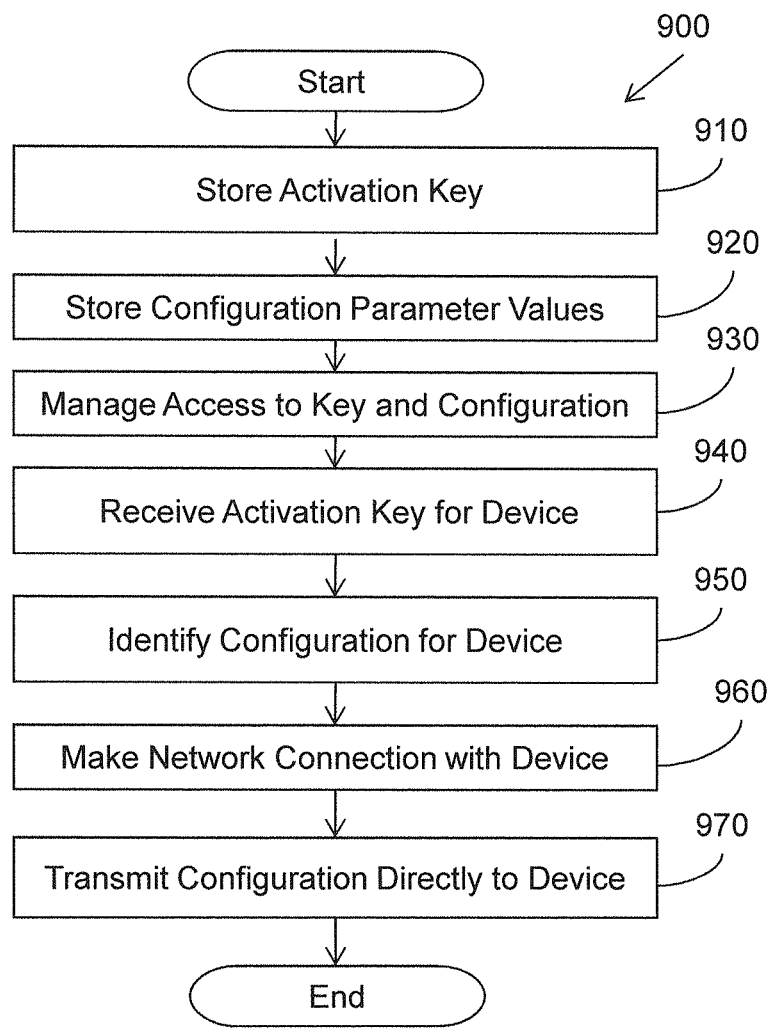
FIG. 9 illustrates one embodiment of a method for performing secure cloud based multi-tier provisioning.

FIG. 9 illustrates one embodiment of a method 900 for performing secure cloud based multi-tier provisioning. The method includes, at 910, storing, in server-side computer storage medium, an activation key for a networked device. At 920, the method includes storing, on the server, a set of configuration parameter values associated with an application to be run by the networked device. At 930, the method includes managing access to the computer storage medium such that access to the activation key and the configuration parameter values by unauthorized entities is prevented. At 940, the method includes receiving the activation key from the authorized installation entity, and at 950, identifying a configuration for the networked device comprising the set of configuration parameter values. The method includes, at 960, making a network connection with the networked device. The method includes, at 970, transmitting the configuration to the networked device, such that the configuration is not provided to the authorized installation entity.

Computer Embodiment

Figure 10:
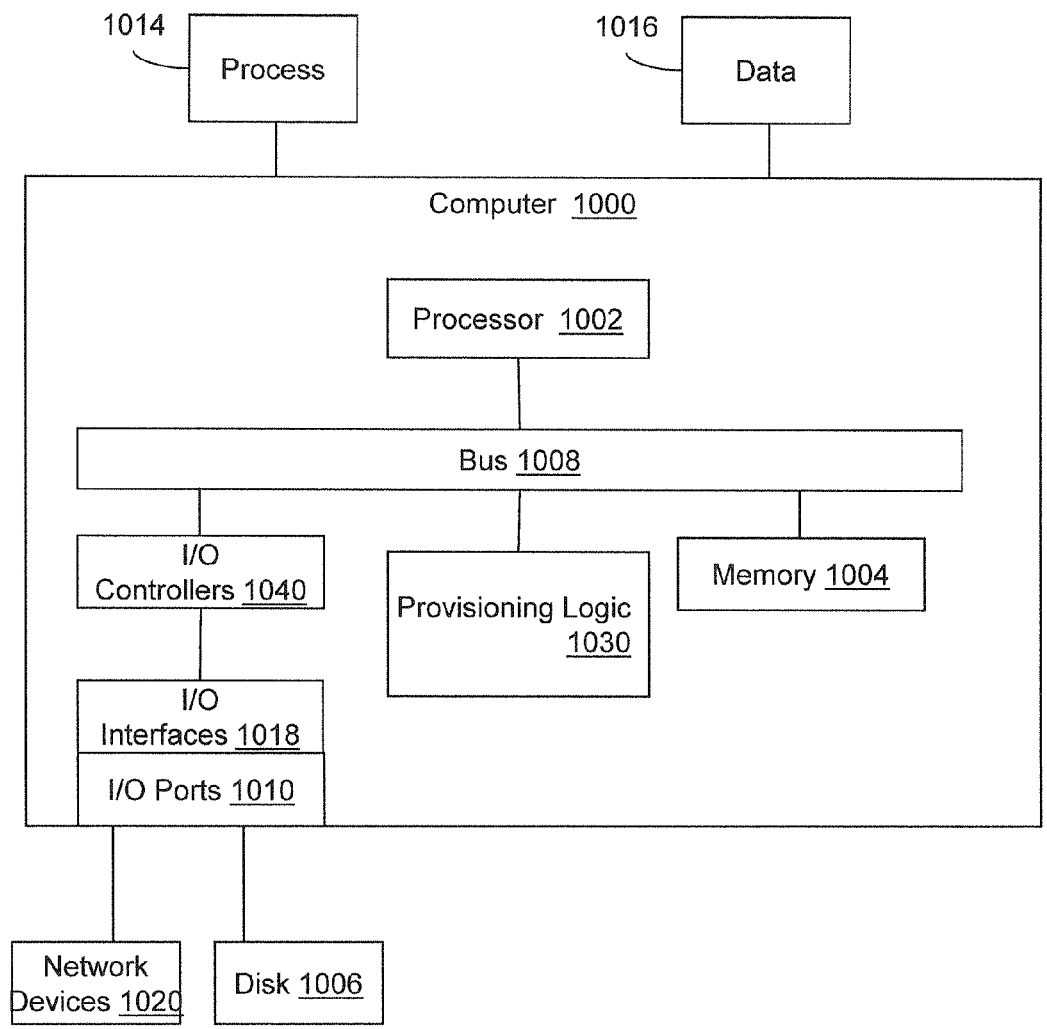
FIG. 10 illustrates an embodiment of a computing system configured with the example systems and/or methods disclosed.

FIG. 10 illustrates an example computing device that is configured and/or programmed with one or more of the example systems and methods described herein, and/or equivalents. The example computing device may be a computer 1000 that includes a processor 1002, a memory 1004, and input/output ports 1010 operably connected by a bus 1008. The computing device 1000 may be the provisioning server 110 of FIGS. 1-8. In one example, the computer 1000 may include provisioning logic 1030 configured to facilitate aggregated network modeling. The provisioning logic 1030 may include any or all of the logics depicted in FIGS. 1-8. In different examples, the provisioning logic 1030 may be implemented in hardware, a non-transitory computer-readable medium with stored instructions, firmware, and/or combinations thereof. While the provisioning logic 1030 is illustrated as a hardware component attached to the bus 1008, it is to be appreciated that in one example, the provisioning logic 1030 could be implemented in the processor 1002.

In one embodiment, the provisioning logic 1030 or the computer is a means (e.g., hardware, non-transitory computer-readable medium, firmware) for secure cloud based multi-tier provisioning. The means may be implemented, for example, as an ASIC programmed to generate and store An aggregated network model that aggregates component models. The means may also be implemented as stored computer executable instructions that are presented to computer 1000 as data 1016 that are temporarily stored in memory 1004 and then executed by processor 1002.

Generally describing an example configuration of the computer 1000, the processor 1002 may be a variety of various processors including dual microprocessor and other multi-processor architectures. A memory 1004 may include volatile memory and/or non-volatile memory. Non-volatile memory may include, for example, ROM, PROM, and so on. Volatile memory may include, for example, RAM, SRAM, DRAM, and so on.

A storage disk 1006 may be operably connected to the computer 1000 via, for example, an input/output interface (e.g., card, device) 1018 and an input/output port 1010. The disk 1006 may be, for example, a magnetic disk drive, a solid state disk drive, a floppy disk drive, a tape drive, a Zip drive, a flash memory card, a memory stick, and so on. Furthermore, the disk 1006 may be a CD-ROM drive, a CD-R drive, a CD-RW drive, a DVD ROM, and so on. The memory 1004 can store a process 1014 and/or a data 1016, for example. The disk 1006 and/or the memory 1004 can store an operating system that controls and allocates resources of the computer 1000.

The computer 1000 may interact with input/output devices via the i/o interfaces 1018 and the input/output ports 1010. Input/output devices may be, for example, a keyboard, a microphone, a pointing and selection device, cameras, video cards, displays, the disk 1006, the networked devices 1020, and so on. The input/output ports 1010 may include, for example, serial ports, parallel ports, and USB ports.

The computer 1000 can operate in a network environment and thus may be connected to the networked devices 1020 via the i/o interfaces 1018, and/or the i/o ports 1010. Through the networked devices 1020, the computer 1000 may interact with a network. Through the network, the computer 1000 may be logically connected to remote computers. Networks with which the computer 1000 may interact include, but are not limited to, a LAN, a WAN, and other networks.

In another embodiment, the described methods and/or their equivalents may be implemented with computer executable instructions. Thus, in one embodiment, a non-transitory computer storage medium is configured with stored computer executable instructions that when executed by a machine (e.g., processor, computer, and so on) cause the machine (and/or associated components) to perform the methods and processes described with reference to FIGS. 1-10.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C §101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium", as used herein, is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage media may include, but are not limited to, a floppy disk, a flexible disk, a hard disk, a magnetic tape, other magnetic medium, an ASIC, a CD, other optical medium, a RAM, a ROM, a memory chip or card, a memory stick, and other electronic media that can store computer instructions and/or data. Computer storage media described herein are limited to statutory subject matter under 35 U.S.C §101.

"Logic", as used herein, includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic as described herein is limited to statutory subject matter under 35 U.S.C §101.

"Entity", as used herein, includes but is not limited to one or more persons, computers or other devices, or combinations of these.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this disclosure is intended to embrace alterations, modifications, and variations that fall within the scope of the appended claims, which satisfy the statutory subject matter requirements of 35 U.S.C. §101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A computer-implemented method comprising, with a server:
   generating an activation key for a set of networked devices;
   storing the activation key in server-side computer storage medium;
   storing, in the server side computer storage medium, a set of configuration parameter values associated with an application to be run by the a networked device in the set of networked devices;
   managing access to the computer storage medium such that access to the activation key and the configuration parameter values by unauthorized entities is prevented;
   receiving, from a customer entity device, an identifier for an authorized installation entity;
   receiving, using a first network connection to an installation device that is different from the set of networked devices and the customer entity device, valid credentials for the authorized installation entity;
   determining, based at least on the valid credentials, that the entity is the authorized installation entity;
   when it is determined that the entity is the authorized installation entity enabling input of a networked device identifier and an activation key on the installation device;
   receiving the networked device identifier and dynamic configuration parameter values from the installation device, where the dynamic configuration parameter values depend on an environment in which the networked device is deployed;
   verifying the dynamic configuration parameter values; and
   prior to transmitting the application configuration to the networked device, adding the dynamic configuration parameter values to the set of configuration parameter values in the application configuration;
   receiving an identifier for the networked device and the activation key from an anonymous access level on the installation device;
   in response to receiving the activation key and networked device identifier from the installation device:
      identifying an application configuration for the networked device comprising the set of configuration parameter values;
      making a second network connection to the networked device; and
      transmitting the application configuration to the networked device using the second network connection, such that the application configuration is not provided to the installation device.

2. The computer-implemented method of claim 1 comprising, with the server:
   in response to receiving the activation key from the installation device:
   accessing a binding object that is associated with the networked device, wherein the binding object maps a selected application configuration with the networked device and is stored in the computer storage medium; and
      transmitting the selected application configuration to the networked device using the second network connection.

3. The computer-implemented method of claim 1 comprising, with the server:
   receiving, from the customer entity device, a local network configuration for a local network in which the networked device is being installed;
   storing the local network configuration in the computer storage medium;
   upon receiving a request from the installation device, transmitting the local network configuration to the installation device, wherein the installation device is configured to transmit the local network configuration to the networked device using a local proximity link between the installation device and the networked device that is independent of the local network, such that the local network configuration is not provided to the authorized installation entity; and
   receiving connection confirmation from the networked device on the local network indicating that the networked device is connected to the server;
   wherein the application configuration is transmitted to the networked device using the local network.

4. The computer-implemented method of claim 1 comprising, with the server:
   receiving, from a first entity that is different from the authorized installation entity, a first configuration parameter value for the networked device;
   storing the first configuration parameter value in the computer storage medium;
   receiving, from a second entity that is different from the authorized installation entity, a second configuration parameter value for the networked device;
   storing the second configuration parameter value in the computer storage medium;
   managing access to the computer storage medium such that the second entity is prevented from reading the first configuration parameter value.

5. The computer-implemented method of claim 4, further comprising, with the server:
   providing a configuration template, wherein the configuration template defines a set of configuration parameters associated with an application to be run by the networked device; and
   capturing, from a selected one of the first entity and the second entity, one or more configurations for the networked device, wherein each configuration comprises a unique set of configuration parameter values for at least a subset of the configuration parameters, further wherein the first configuration parameter value and the second configuration parameter value are members of at least one of the configurations.

6. The computer-implemented method of claim 4, further comprising, with the server:
   providing a configuration template, wherein the configuration template provides an interface for a selected one of the first entity and the second entity to define configuration parameters associated with an application to be run by the networked device; and
   capturing, from a selected one of the first entity and the second entity, one or more configurations for the networked device, wherein each configuration comprises a unique set of configuration parameter values for at least a subset of the configuration parameters, further wherein the first configuration parameter value and the second configuration parameter value are members of at least one of the configurations.

7. A computing system, comprising:
   a networked device configured to operate according to a set of configuration parameter values for corresponding configuration parameters;
   a provisioning server configured to:
      generate an activation key for a set of networked devices that includes the networked device;
      store the activation key in server-side storage medium;
      create an application configuration for the networked device comprising the set of configuration parameter values by:
         collecting first configuration parameter values for the networked device from a first entity and second configuration parameter values for the networked device from a second entity;
         storing the configuration parameter values in server side computer storage medium; and
         controlling access to the computer storage medium such that the second entity is prevented from reading the first configuration value;
      receive, from a customer entity device, an identifier for an authorized installation entity;
      receive, using a first network connection, from an installation device that is different from the set of networked devices and the customer entity device, valid credentials for the authorized installation entity;
      determine, based at least on the valid credentials, that the entity is the authorized installation entity;
      when it is determined that the entity is the authorized installation entity enable input of a networked device identifier and an activation key on the installation device;
      receive the networked device identifier and dynamic configuration parameter values from the installation device, where the dynamic configuration parameter values depend on an environment in which the networked device is deployed;
      verify the dynamic configuration parameter values; and
      prior to transmitting the application configuration to the networked device, add the dynamic configuration parameter values to the set of configuration parameter values in the application configuration;
      receive the activation key from an anonymous access level on the installation device;
      in response to receiving the activation key and networked device identifier from the installation device, make a second network connection to the networked device;
      transmit the application configuration comprising the configuration parameter values to the networked device such that the application configuration is not transmitted to the installation device.

8. The computing system of claim 7 wherein the networked device includes device resident computer storage medium storing default configuration parameters, wherein the default configuration parameters include connectivity information that is used by the networked device to connect to the provisioning server.

9. The computing system of claim 7 wherein the provisioning server comprises:
   procurement logic configured to create a procurement object associated with the networked device;
   wherein the procurement object is stored in server side computer storage medium; and
   wherein the procurement object comprises a networked device identifier for the device, an owner of the device, and an activation key; and
   wherein the server is configured to prevent access to the procurement object by the authorized installation entity.

10. The computing system of claim 7 wherein the provisioning server comprises:
    configuration logic configured to create i) one or more application configuration objects, wherein each application configuration object comprises configuration parameter values for a selected subset of the configuration parameters, and ii) a binding object that maps a selected application configuration object to the networked device;
    wherein the one or more application configuration objects and binding object are stored in server side computer storage medium; and
    wherein the configuration logic is configured to prevent access to the application configuration objects by the authorized installation entity.

11. The computing system of claim 7 wherein the provisioning server comprises device connection logic configured to:
    receive local network configuration related configuration parameter values associated with a local network in which the networked device is being installed;
    upon receiving a request from the installation device, transmitting the local network configuration related configuration parameter values to the installation device, where the installation device is configured to transmit the local network configuration related configuration parameter values to the networked device using a local proximity link;
    receiving connection confirmation from the networked device on the local network indicating that the networked device is connected to the provisioning server using the local network; and
    wherein the provisioning server is configured to transmit the application configuration to the networked device using the local network;

further wherein the installation device prevents the authorized installation entity from reading the local network configuration related configuration parameter values.

12. A non-transitory computer-readable storage medium storing computer-executable instructions that when executed by a computer cause the computer to perform corresponding functions, the instructions comprising:
generating an activation key for a set of networked devices;
storing the activation key in server-side computer storage medium;
storing, in the server side computer storage medium, a set of configuration parameter values associated with an application to be run by a networked device in the set of networked devices;
managing access to the computer storage medium such that access to the activation key and the configuration parameter values by unauthorized entities is prevented;
receiving, from a customer entity device, an identifier for an authorized installation entity;
receiving, using a first network connection, from an installation device that is different from the set of networked devices and the customer entity device, valid credentials for the authorized installation entity;
determining, based at least on the valid credentials, that the entity is the authorized installation entity;
when it is determined that the entity is the authorized installation entity enabling input of a networked device identifier and an activation key on the installation device;
receiving the networked device identifier and dynamic configuration parameter values from the installation device, where the dynamic configuration parameter values depend on an environment in which the networked device is deployed;
verifying the dynamic configuration parameter values; and
prior to transmitting the application configuration to the networked device, adding the dynamic configuration parameter values to the set of configuration parameter values in the application configuration;
receiving an identifier for the networked device and the activation key from an anonymous access level on the installation device;
in response to receiving the activation key and networked device identifier from the installation device:
identifying an application configuration for the networked device comprising the set of configuration parameter values;
making a second network connection to the networked device; and
transmitting the application configuration to the networked device using the second network connection, such that the application configuration is not provided to the installation device.

13. The non-transitory computer-readable storage medium of claim 12, wherein the instructions include instructions for:
in response to receiving the activation key from the installation device using the first network connection:
accessing a binding object that is associated with the networked device, wherein the binding object maps a selected application configuration with the networked device and is stored in the computer storage medium; and
transmitting the selected application configuration to the networked device using the second network connection.

14. The non-transitory computer-readable storage medium of claim 12, wherein the instructions include instructions for:
receiving, from an entity different from the authorized installation entity, a local network configuration for a local network in which the networked device is being installed;
storing the local network configuration in the computer storage medium;
upon receiving a request from the installation device, transmitting the local network configuration to the installation device-using a local proximity link such that the local network configuration is not provided to the authorized installation entity;
receiving connection confirmation from the networked device on the local network indicating that the networked device is connected to the server using the local network; and
wherein the application configuration is transmitted to the networked device using the local network.

15. The non-transitory computer-readable storage medium of claim 12, wherein the instructions include instructions for:
receiving, from a first entity that is different from the authorized installation entity, a first configuration parameter value for the networked device;
storing the first configuration parameter value in the computer storage medium;
receiving, from a second entity that is different from the authorized installation entity, a second configuration parameter value for the networked device;
storing the second configuration parameter value in the computer storage medium;
managing access to the computer storage medium such that the second entity is prevented from reading the first configuration parameter value.

16. The non-transitory computer-readable storage medium of claim 15, wherein the instructions include instructions for:
providing a configuration template, wherein the configuration template defines a set of configuration parameters associated with an application to be run by the networked device; and
capturing, from a selected one of the first entity and the second entity, one or more application configurations for the networked device, wherein each application configuration comprises a unique set of configuration parameter values for at least a subset of the configuration parameters, further wherein the first configuration parameter value and the second configuration parameter value are members of at least one of the application configurations.

17. The non-transitory computer-readable storage medium of claim 15, wherein the instructions include instructions for:
providing a configuration template, wherein the configuration template provides an interface for a selected one of the first entity and the second entity to define configuration parameters associated with an application to be run by the networked device; and
capturing, from a selected one of the first entity and the second entity, one or more application configurations for the networked device, wherein each application configuration comprises a unique set of configuration parameter values for at least a subset of the configuration parameters, further wherein the first configuration parameter value and the second configuration parameter value are members of at least one of the application configurations.

* * * * *